United States Patent
Sekar et al.

(10) Patent No.: US 12,506,208 B2
(45) Date of Patent: Dec. 23, 2025

(54) ELECTRIC VEHICLE BATTERY PACK HAVING BOTTOM STRIKE SHIELD

(71) Applicant: Rivian IP Holdings, LLC, Irvine, CA (US)

(72) Inventors: Vignesh Sekar, Westland, MI (US); Jagannathan Shankar Mahadevan, Canton, MI (US); Anish Shah, Ann Arbor, MI (US); Tyler Collins, Irvine, CA (US); Zubin Hareshkumar Padia, Canton, MI (US); Nathaniel C. Wynn, Tustin, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/544,786

(22) Filed: Dec. 19, 2023

(65) Prior Publication Data
US 2024/0120596 A1  Apr. 11, 2024

Related U.S. Application Data

(63) Continuation of application No. 16/682,738, filed on Nov. 13, 2019, now Pat. No. 11,936,058.
(Continued)

(51) Int. Cl.
*H01M 50/242* (2021.01)
*B60L 50/64* (2019.01)
(Continued)

(52) U.S. Cl.
CPC ........... *H01M 50/242* (2021.01); *B60L 50/64* (2019.02); *B62D 25/20* (2013.01); *H01M 50/207* (2021.01);
(Continued)

(58) Field of Classification Search
CPC . H01M 50/249; H01M 50/242; H01M 50/282
See application file for complete search history.

(56) References Cited

U.S. PATENT DOCUMENTS

| 5,555,950 A | 9/1996 | Harada et al. |
| 5,833,023 A | 11/1998 | Shimizu |

(Continued)

FOREIGN PATENT DOCUMENTS

| CN | 102468454 A | 5/2012 |
| DE | 102010024320 A1 | 12/2011 |

(Continued)

OTHER PUBLICATIONS

Zhiyuan Yu et al., "Carbon Fiber Reinforced Epoxy Resin Matrix Composites", Materials Science: Advanced Composite Materials (2017), pp. 1-6 (Year: 2017).*

(Continued)

*Primary Examiner* — Jessie Walls-Murray
(74) *Attorney, Agent, or Firm* — Haley Guiliano LLP

(57) ABSTRACT

An electric vehicle battery pack with a strike shield affixed to its bottom. The strike shield provides structural support to withstand ground strikes without damaging the batteries within the battery pack. The strike shield is a mixed material sandwich bottom plate structure having a composite top layer, a middle core with one or more hollow members adhesively connected or welded together, or a single integrated structure with elongated stiffeners and/or a base member with elongated channels for stiffness, and a composite bottom layer.

20 Claims, 3 Drawing Sheets

Related U.S. Application Data

(60) Provisional application No. 62/760,635, filed on Nov. 13, 2018.

(51) Int. Cl.

| | | |
|---|---|---|
| *B62D 25/20* | (2006.01) | |
| *H01M 50/207* | (2021.01) | |
| *H01M 50/224* | (2021.01) | |
| *H01M 50/233* | (2021.01) | |
| *H01M 50/24* | (2021.01) | |
| *H01M 50/249* | (2021.01) | |
| *H01M 50/271* | (2021.01) | |

(52) U.S. Cl.
CPC ......... *H01M 50/233* (2021.01); *H01M 50/24* (2021.01); *H01M 50/249* (2021.01); *H01M 50/271* (2021.01); *H01M 50/224* (2021.01); *H01M 2220/20* (2013.01)

(56) References Cited

U.S. PATENT DOCUMENTS

| | | | |
|---|---|---|---|
| 6,848,233 B1* | 2/2005 | Haszler | B32B 3/28 |
| | | | 52/783.17 |
| 8,393,129 B2 | 3/2013 | Arsene et al. | |
| 9,016,765 B1* | 4/2015 | Rawlinson | B60L 50/66 |
| | | | 296/187.07 |
| 9,281,505 B2 | 3/2016 | Hihara et al. | |
| 10,308,290 B1 | 6/2019 | Dequine et al. | |
| 2004/0119276 A1* | 6/2004 | Fior | B62D 23/005 |
| | | | 280/781 |
| 2008/0202066 A1* | 8/2008 | Arsene | E04C 2/34 |
| | | | 52/793.11 |
| 2008/0315629 A1 | 12/2008 | Abe et al. | |
| 2011/0076435 A1 | 3/2011 | Tachibana et al. | |
| 2012/0160088 A1 | 6/2012 | Rawlinson | |
| 2012/0270095 A1 | 10/2012 | Kim | |
| 2012/0282516 A1 | 11/2012 | Kim | |
| 2014/0182958 A1 | 7/2014 | Rawlinson et al. | |
| 2015/0171485 A1 | 6/2015 | Rawlinson | |
| 2015/0318525 A1 | 11/2015 | Maguire et al. | |
| 2015/0336452 A1 | 11/2015 | Decker | |
| 2016/0272246 A1 | 9/2016 | Berger et al. | |
| 2018/0105209 A1 | 4/2018 | Fees et al. | |
| 2018/0272887 A1 | 9/2018 | Wiles et al. | |
| 2019/0100090 A1 | 4/2019 | Matecki et al. | |
| 2019/0248419 A1 | 8/2019 | Mukaigawa et al. | |
| 2019/0334144 A1* | 10/2019 | Kim | B23K 9/0035 |
| 2020/0144565 A1 | 5/2020 | Zeng et al. | |
| 2021/0111386 A1 | 4/2021 | Kellner et al. | |
| 2021/0402861 A1 | 12/2021 | Aitharaju et al. | |

FOREIGN PATENT DOCUMENTS

| | | |
|---|---|---|
| JP | 2015-189092 A | 11/2015 |
| JP | 2015-224027 A | 12/2015 |

OTHER PUBLICATIONS

Excerpt (Fig. 2) From: Gutiérrez, Carolina et al. (2017). Analysis of the ichnogenus Herradurichnus in quartzites of the Balcarce Formation (lower Silurian) from the Tandilia System of Argentina. Bollettino della Società Paleontologica Italiana. 56. 10.4435/BSPI.2017.16. (Year: 2017).*

Excerpt (Fig. 1) From: Wanjala, Christine & Waitumbi, John & Zhou, Guofa & Githeko, Andrew. (2011). Identification of malaria transmission and epidemic hotspots in the Western Kenya highlands: its application to malaria epidemic prediction. Parasites & vectors. 4. 81. 10.1186/1756-3305-4-81. (Year: 2011).*

How Do Sandwich Panels Work?—Aerospace Engineering Blog <https://aerospaceengineeringblog.com/sandwich-panel/> (Year: 2013).

International Search Report and Written Opinion received for PCT Patent Application No. PCT/US2019/061214, mailed on Feb. 7, 2020, 12 pages.

Zou Zhengyao, Wang Ruoping, "New Energy Vehicle Technology", National Defense Industry publishing house, Jul. 31, 2012, pp. 130-132. (Chinese language, English Machines Translation attached).

* cited by examiner

ELECTRIC VEHICLE BATTERY PACK HAVING BOTTOM STRIKE SHIELD

CROSS-REFERENCE TO RELATED APPLICATION

This application is a continuation application of U.S. application Ser. No. 16/682,738, filed Nov. 13, 2019, which claims the benefit of U.S. Provisional Patent Application No. 62/760,635 filed Nov. 13, 2018, the disclosures of which are hereby incorporated by reference herein in their entirety.

INTRODUCTION

The present disclosure is directed to electric vehicle battery packs. More specifically, the present disclosure is directed to electric vehicle battery packs having bottom strike shields.

SUMMARY

A vital component of current electric vehicles is the battery pack. Conventional battery packs perform a number of functions, including providing a protective enclosure to withstand crashes, ground strikes, or other impacts, routing of electrical wires, and containment of battery fires.

The ability to withstand ground strikes is of particular concern with certain vehicles such as electric off-road vehicles. The uneven terrain such vehicles often traverse results in a high risk of ground strikes during driving. The battery packs of these vehicles must withstand such ground strikes without puncturing, crushing, or otherwise structurally compromising the batteries or other components within.

Accordingly, described herein is a strike shield affixed to the bottom of the battery pack, which provides structural support to withstand ground strikes without damaging the batteries and other components within the battery pack. The strike shield is a mixed material sandwich bottom plate structure having a top layer (e.g., a composite layer), a middle core with multiple hollow members adhesively connected or welded together or a single integrated structure with elongated stiffeners and/or a base member with elongated channels for stiffness, and a bottom layer (e.g., a composite layer or a metal layer such as steel).

In some embodiments, the hollow members can be high strength aluminum extrusions for example, and can also each have a substantially rectangular cross section.

This cross section may be of any dimensions, including for instance a height between approximately 10 mm and approximately 20 mm, and/or a width between approximately 75 mm and approximately 125 mm, and/or a wall thickness between approximately 1.5 mm and approximately 3.5 mm. Any height, width, and wall thickness values are contemplated. As a specific but nonlimiting example, the cross section may have a height of approximately 15 mm, a width of approximately 100 mm, and a wall thickness of approximately 2.5 mm.

The top layer may, for example, be made of any composite material, such as a carbon fiber or aramid fiber composite body having one or more fiber layers. These fiber layers may be of any thickness, such as a thickness between approximately 1 mm and approximately 3 mm.

Similarly, the bottom layer may, for example, also be made of any composite material. As one example, the bottom layer may be constructed identical or similar to the composite top layer. As another example, the bottom layer may be a carbon fiber or aramid fiber composite structure, and may additionally or alternatively have a steel layer. This steel layer may be of any thickness, such as a thickness between approximately 0.4 mm and approximately 0.8 mm.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to an electric vehicle battery pack with a strike shield affixed to its bottom. The strike shield provides structural support to withstand ground strikes without damaging the batteries within the battery pack. The strike shield is a mixed material sandwich bottom plate structure having a top layer, a middle core with one or more hollow members adhesively connected or welded together, or a single integrated structure with elongated stiffeners and/or a base member with elongated channels for stiffness, and a bottom layer.

Figure 1:
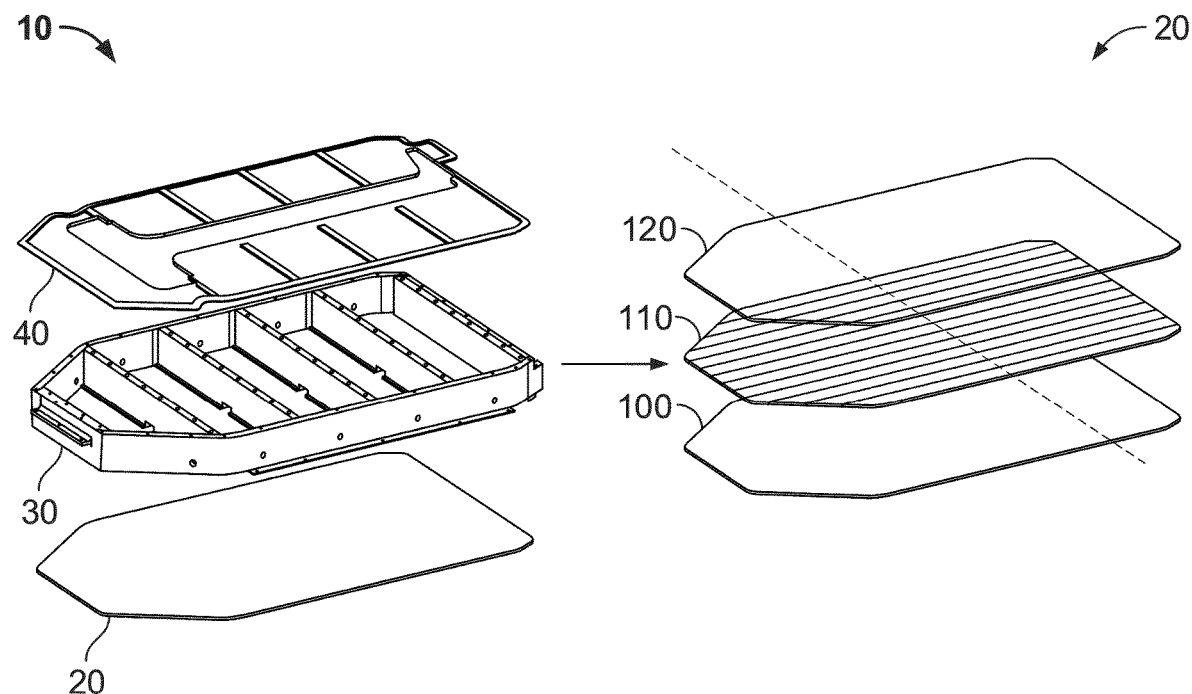
FIG. 1 illustrates isometric exploded views of an exemplary battery pack and an exemplary strike shield, in accordance with some embodiments of the disclosure.

An exploded view of an exemplary battery pack is shown on the left side of FIG. 1. Here, strike shield 20 is the bottom plate or lower layer of the battery pack 10, and is affixed to the bottom of the battery pack frame 30. An exploded view of the strike shield 20 is shown on the right side of FIG. 1. The strike shield 20 top layer 120 is nearest the frame 30 and is affixed thereto when the battery pack 10 is assembled. The middle core 110 is attached to the top layer 120 with an adhesive, and the bottom layer 100 is also adhesively attached to the middle core 110 with an adhesive (e.g., the same adhesive). Any adhesive may be used to bond the layers of the strike shield 20 together. For example, a structural 2-part epoxy may be used. In embodiments employing a metal bottom layer as discussed below, the middle core 110 and bottom layer 100 may be spot welded instead of affixed to each other with an adhesive.

In some embodiments, the top layer 120 is a composite layer. The composite layer may be a bi-directional twill woven carbon fiber ply in an epoxy matrix. Alternatively, the composite layer may be an aramid fiber ply in an epoxy matrix. The matrix may also be a phenolic-based matrix. The top layer 120 may have any thickness between 1 mm and 3 mm, but more specifically may have a thickness of 2 mm. Multiple plies may also be used. In other embodiments, the composite layer may comprise glass fibers in an epoxy or other matrix. Glass fibers may be used, for example, for reduced cost and to prevent galvanic corrosion that may occur between carbon fibers and an aluminum middle core 110. Any fiber or combinations of fiber and any matrix may be employed, however.

In some embodiments, the bottom layer 100 may also be a composite layer. As one example, the bottom layer 100 may have a unidirectional carbon fiber layer and one or more aramid plies, with an epoxy matrix. As with the top layer 120, any number of plies may be used, of any type of fiber and with any matrix. Alternatively, the bottom layer 100 may be a steel layer, for example a 0.4 mm to 0.8 mm thickness steel layer. As a more specific example, the steel layer may be a 0.6 mm thick steel layer. The steel layer may be a stamped steel layer.

Figure 2:
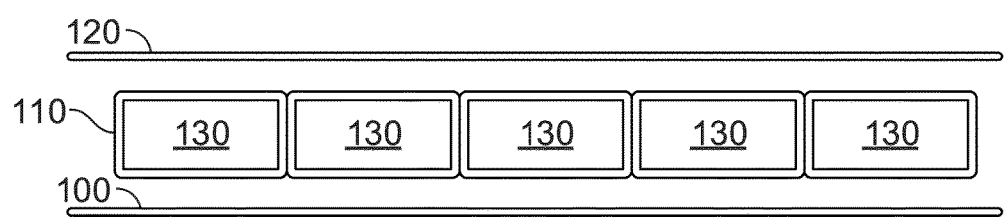
FIG. 2 is a cross-sectional view taken along the dashed line of the exemplary strike shield of FIG. 1.

The middle core 110 comprises several parallel elongated hollow members glued or welded together to form a single layer. FIG. 2 is a cross-sectional view of the layers of the strike shield 20, taken along the dashed line of FIG. 1. Each hollow member 130 may have a rectangular cross section, and neighboring members 130 are bonded (e.g., glued or welded) together to form a single layer of rectangular cells placed adjacent to each other, as seen in the view of FIG. 2. When constructed with rectangular cross sections, the elongated members 130 may have a height between 10 mm and 20 mm, a width between 75 mm and 125 mm, and a wall thickness between 1.5 mm and 3.5 mm. As a more specific example, the elongated members may be approximately 15 mm in height and 100 mm in width, with a 2.5 mm wall thickness, although any dimensions are contemplated. It is also noted that the elongated hollow members 130 may be of any cross sectional shape, and are not limited to the rectangular profile shown. An alternate design, with a different profile, is shown below in connection with FIG. 3. The elongated members 130 can be extruded aluminum members, and may for example be constructed of 6082 aluminum alloy extruded into the rectangular members 130 shown in FIG. 2, although any material may be used. In particular, any extrudable aluminum alloy may be employed.

Figure 3:
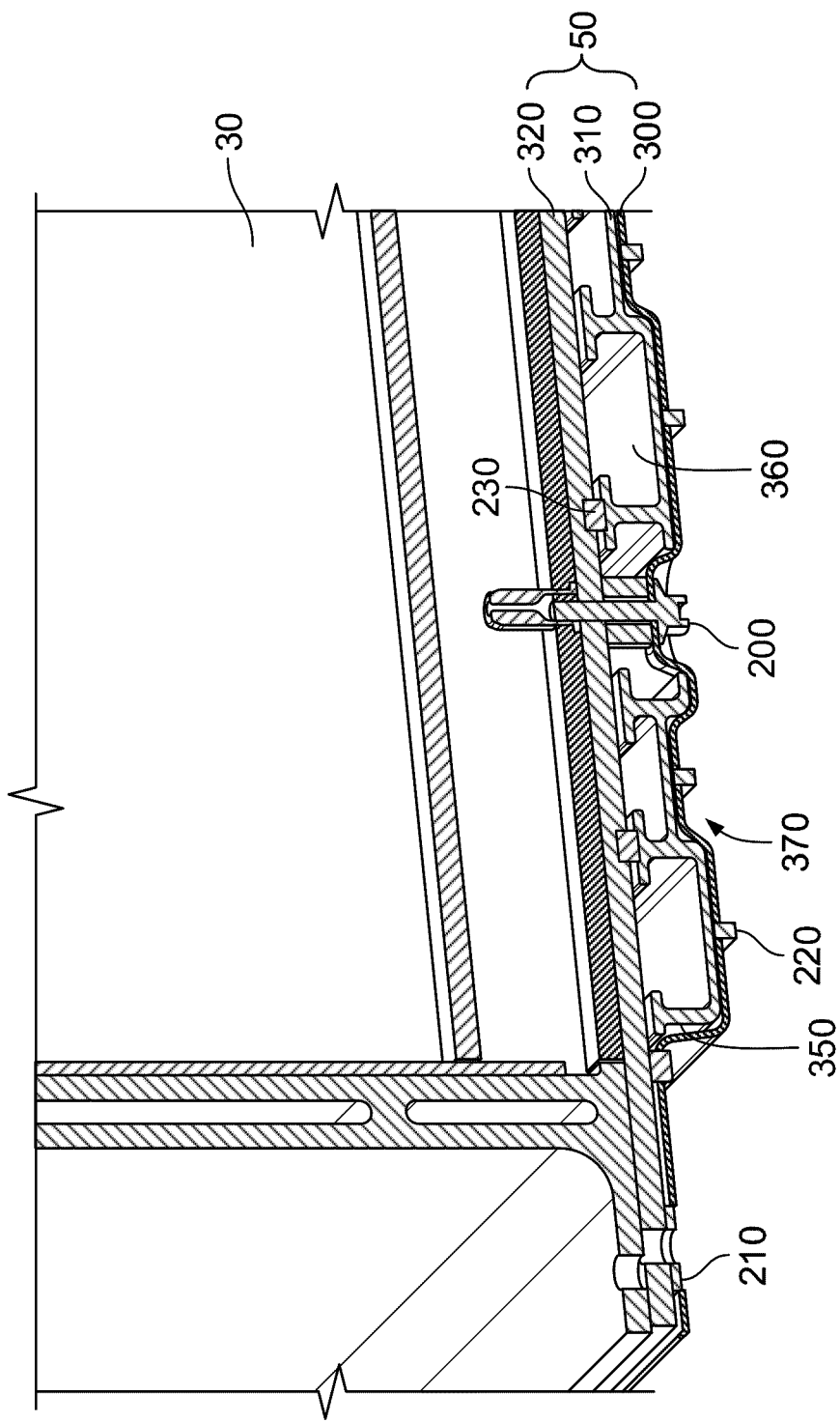
FIG. 3 is a cross-sectional view showing details of another exemplary strike shield and its attachment to an exemplary battery pack, in accordance with some embodiments of the disclosure.

FIG. 3 is a cross-sectional view showing details of another exemplary strike shield 50 and its attachment to an exemplary battery pack, in accordance with some embodiments of the disclosure. The strike shield 50 of FIG. 3 comprises a bottom layer 300, a middle core 310, and a top layer 320. The bottom layer 300, middle core 310, and top layer 320 may be made of the same materials as corresponding bottom layer 100, middle core 110, and top layer 120 described above. For example, bottom layer 300 may be a composite layer such as a carbon fiber or aramid fiber composite layer, middle core 310 may be an extruded aluminum layer, and top layer 320 may be a composite layer such as a carbon fiber or aramid fiber composite layer. Layers 300, 310, 320 may be affixed to each other in any manner, such as with removable fasteners, non-removable fasteners, an adhesive, or the like. As described further below, strike shield 50 of FIG. 3 is constructed as a removable structure, for easy removal to facilitate repair or replacement.

Here, the strike shield 50 is shown attached to a bottom surface of frame 30 with a number of fasteners 200. Similarly, the bottom layer 300 and top layer 320 are attached to each other with a number of fasteners 210 as shown. Fasteners 200 and 210 may each be any fastener, such as a screw, nail, bolt, rivet, an adhesive, or any other suitable device for affixing two structures to each other. Fasteners 210 extend through bottom layer 300 and top layer 320, in areas where middle core 310 is not present, to affix the top layer 320 to the bottom layer 300 and to affix the middle core 310 therebetween. Fasteners 200 extend through all three layers 300, 310, 320 of strike shield 50 and into battery pack frame 30, for removable attachment of the strike shield 50 to battery pack frame 30. Accordingly, strike shield 50 may be attached to frame 30 with fasteners 200, and removed therefrom by removing fasteners 200. The strike shield 50 of FIG. 3 may thus be readily removed and reattached if desired, using fasteners 200. In this manner, strike shield 50 may be more easily repaired and replaced, or may be removable for easier access to components within battery pack 10.

A number of features 220 may be added to act as locating features for strike shield 50 and bottom layer 300, and to increase rigidity and strength of the strike shield 50. Features 220 may be made of any material, such as a structural adhesive, a metal, a plastic, or the like. Additionally, features 230 may be added to dampen or prevent rattle or vibration which may occur between composite top layer 320 and metallic middle core 310. Features 230 may be made of any material suitable for damping or preventing vibration, such as an adhesive, a plastic, or the like.

FIG. 3 illustrates certain embodiments in which middle core 310 is not constructed of separate parallel members affixed to each other, but is instead a single integral structure with a number of elongated stiffener members 350 extending vertically from base member 360. The base member 360 may be formed with areas of differing elevation, to form a number of elongated channels 370 therein. The elongated channels 370 and stiffener members 350 may extend along a major axis of the middle core 310 (perpendicular to the plane through which the cross section of FIG. 2 is taken), to increase the rigidity and strength of middle core 310. Any number and dimensions of channels 370 and stiffener members 350 are contemplated. Furthermore, it may be observed that adjacent stiffener members 350 and the portion of base member 360 therebetween form a single integral structure that, in the embodiment of FIG. 3, can be considered a rigid, elongated, and generally U-shaped member that provides structural rigidity and strength to middle core 310. The middle core 310 may thus be thought of as comprising any number of such U-shaped members each connected to and extending continuously from the other in generally parallel arrangement, to form a single integral structure. These U-shaped members may be of the same or varying geometry. The embodiment of FIG. 3 illustrates two differently sized U-shaped members as shown, with smaller U-shaped members next to larger U-shaped members in alternating manner. That is, the base member 360 may be formed with multiple different elevations for added stiffness, potential aerodynamic benefits, and the like.

It will also be understood that the middle core 310 may also be thought of as adjacent I-beams that have elongated and connected bottom flanges that form a single integral structure. Any geometry and shape of these members is contemplated. For instance, instead of U-shaped members, middle core 310 may have a number of V-shaped members, fully-enclosed members, or members of any other cross-sectional shape or shapes that provide increased rigidity and/or strength. Additionally, while a single strike shield 50 is shown, other embodiments may utilize multiple smaller strike shields 50 that collectively cover the bottom of battery pack frame 30. Such configurations allow for removal and/or replacement of smaller portions of the strike shield 50 when, for example, only a portion of strike shield 50 is damaged or should be replaced. Each of these smaller strike shields 50 may be configured in any manner disclosed herein, to cover portions of battery pack frame 30.

Figure 4:
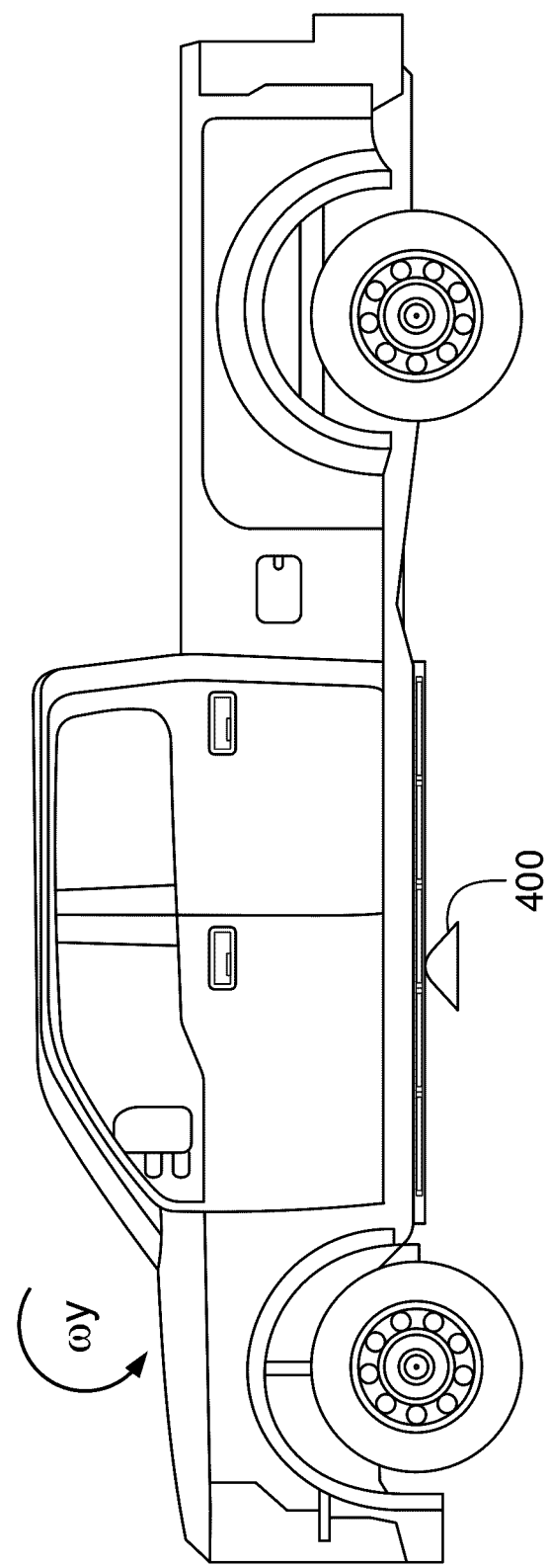
FIG. 4 illustrates an exemplary loading condition of an exemplary strike shield, in accordance with some embodiments of the disclosure.

FIG. 4 illustrates an exemplary loading condition of the strike shield. A ground strike onto a generally conical stationary object 400 has been simulated, for an off-road vehicle weighing one half of a gross vehicle weight rating (GVWR) of 3470 kg. It has been found that a strike shield constructed as above prevents the object from crushing the shield and protruding into the battery pack, and also prevents battery pack deformation significant enough to cause damage to the internal battery modules. Accordingly, the strike shield construction of the present disclosure offers sufficient protection against ground strikes for off-road electric vehicles, while also having lower weight than conventional steel strike shields and having lower cost than conventional monolithic high strength carbon fiber composite strike shields.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present disclosure are presented for purposes of illustration and description. They are not intended to be exhaustive or to limit the invention to the precise forms disclosed. Many modifications and variations are possible in view of the above teachings. For example, the middle core may have extruded members of any cross section, any aluminum alloy, and any dimensions. The embodiments were chosen and described in order to best explain the principles of the disclosure and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure. All dimensional values are approximate, and may vary.

What is claimed is:

1. A strike shield, comprising:
   a composite layer;
   an extruded aluminum layer, arranged below the upper composite layer, comprising a plurality of V-shaped members; and
   a steel layer arranged below and affixed to the extruded aluminum layer, wherein:
      the plurality of V-shaped members form a single integral structure comprising a plurality of V-shaped channels;
      respective tops of each respective V-shaped channel of the plurality of V-shaped channels comprise respective flanges;
      at least one of the respective flanges is coupled to a bottom surface of the composite layer between adjacent V-shaped channels of the plurality of V-shaped channels; and
      the strike shield is affixed to one or more frame members.

2. The strike shield of claim 1, wherein:
   adjacent V-shaped members of the plurality of V-shaped members are arranged in an alternating manner; and
   each of the adjacent V-shaped members comprises a respective stiffener member for increased rigidity and strength of the extruded aluminum layer.

3. The strike shield of claim 2, wherein:
   each of the respective stiffener members extend from a base member; and
   each of the respective stiffener members extend along a respective channel formed between the adjacent V-shaped members to increase strength and rigidity of the respective channel.

4. The strike shield of claim 1, wherein adjacent V-shaped members extend from respective flanges between the adjacent V-shaped members to form the single integral structure comprising the plurality of V-shaped channels.

5. The strike shield of claim 1, wherein;
   the composite layer faces a battery pack frame;
   the composite layer comprises a plurality of plies; and
   each ply of the plurality of plies comprises a bi-directional epoxy matrix.

6. The strike shield of claim 1, wherein the at least one of the respective flanges is coupled to the bottom surface of the composite layer by an adhesive.

7. The strike shield of claim 1, wherein the composite layer comprises one or more of carbon fibers, glass fibers, or aramid fibers.

8. The strike shield of claim 1, a wherein the steel layer is affixed to a side of the extruded aluminum layer opposite a side of the extruded aluminum layer comprising the at least one of the respective flanges that is affixed to the composite layer.

9. The strike shield of claim 8, wherein the steel layer has a thickness between 0.4 mm and 0.8 mm.

10. The strike shield of claim 1, wherein each of the V-shaped members that collectively form the single integral structure has a respective wall thickness between 1.5 mm and 3.5 mm.

11. A battery pack comprising:
    a plurality of frame members; and
    a strike shield comprising:
       a composite layer; and
       an extruded aluminum layer, arranged below the composite layer, comprising a plurality of V-shaped members; and
       a steel layer arranged below and affixed to the extruded aluminum layer, wherein:
          the plurality of V-shaped members collectively form a single integral structure comprising a plurality of V-shaped channels,
          respective tops of each respective V-shaped channel of the plurality of V-shaped channels comprise respective flanges,
          at least one of the respective flanges is coupled to a bottom surface of the composite layer between adjacent V-shaped channels of the plurality of V-shaped channels, and
          the strike shield is affixed to one or more of the plurality of frame members.

12. The battery pack of claim 11, wherein:
    adjacent V-shaped members of the plurality of V-shaped members are arranged in an alternating manner; and
    each of the adjacent V-shaped members comprises a respective stiffener member for increased rigidity and strength of the extruded aluminum layer.

13. The battery pack of claim 12, wherein:
    each of the respective stiffener members extend from a base member; and
    each of the respective stiffener members extend along a respective channel formed between the adjacent V-shaped members to increase strength and rigidity of the respective channel.

14. The battery pack of claim 11, wherein adjacent V-shaped members extend from respective flanges between the adjacent V-shaped members to form the single integral structure comprising the plurality of V-shaped channels.

15. The battery pack of claim 11, wherein the at least one of the respective flanges is coupled to the bottom surface of the composite layer with an adhesive.

16. The battery pack of claim 11, a wherein the steel layer is affixed to a side of the extruded aluminum layer opposite a side of the extruded aluminum layer comprising the at least one of the respective flanges that is affixed to the composite layer.

17. The battery pack of claim 16, wherein the steel layer has a thickness between 0.4 mm and 0.8 mm.

18. The battery pack of claim 11, wherein each of the V-shaped members that collectively form the single integral structure has a respective wall thickness between 1.5 mm and 3.5 mm.

19. A battery pack strike shield comprising:
   a composite layer;
   an extruded aluminum layer, arranged below the composite layer, comprising a plurality of V-shaped members between the composite layer, and
   a steel layer, the steel layer arranged below and affixed to the extruded aluminum layer, wherein:
   the plurality of V-shaped members collectively form a single integral structure comprising a plurality of V-shaped channels;
   respective tops of each respective V-shaped channel of the plurality of V-shaped channels comprise respective flanges;
   at least one of the respective flanges is coupled to a bottom surface of the composite layer between adjacent V-shaped channels of the plurality of V-shaped channels; and
   the battery pack strike shield is affixed to one or more of a plurality of frame members.

20. The battery pack strike shield of claim 19, wherein:
   adjacent V-shaped members of the plurality of V-shaped members are arranged in an alternating manner; and
   each of the adjacent V-shaped members comprise a respective stiffener member for increased rigidity and strength of the extruded aluminum layer.

* * * * *